P. T. WISE, J. F. MALCOLM & C. T. DAVIS.
PRODUCTION OF SUTURES, LIGATURES, OR THE LIKE.
APPLICATION FILED JULY 5, 1917.

1,281,466.                                                                 Patented Oct. 15, 1918.

Inventors
Paul T. Wise,
James F Malcolm and
Charles T. Davis.
By their Attorneys,

UNITED STATES PATENT OFFICE.

PAUL T. WISE, OF FLUSHING, JAMES F. MALCOLM, OF ELMHURST, AND CHARLES T. DAVIS, OF BROOKLYN, NEW YORK, ASSIGNORS TO DAVIS & GECK, INC., OF BROOKLYN, NEW YORK, A CORPORATION OF NEW YORK.

PRODUCTION OF SUTURES, LIGATURES, OR THE LIKE.

1,281,466.　　　　　Specification of Letters Patent.　　Patented Oct. 15, 1918.

Application filed July 5, 1917. Serial No. 178,682.

*To all whom it may concern:*

Be it known that we, PAUL T. WISE, JAMES F. MALCOLM, and CHARLES T. DAVIS, all citizens of the United States, residing at Flushing, L. I., Elmhurst, L. I., and Brooklyn, and State of New York, have invented new and useful Improvements in the Production of Sutures, Ligatures, or the like, of which the following is a specification.

This invention relates to the production of sutures or ligatures or the like, and more particularly to the formation thereof from the fiber material of animals, such for instance, as tendons, sinews, or ligaments.

Under present day conditions the sources of supply of the material now generally employed in the production of sutures, ligatures, strings for musical instruments and tennis rackets, etc.,—the intestines of sheep, etc.,—are more or less limited due to the largely increased demand for surgical purposes. This deficiency in supply has not only resulted in inevitable higher cost of manufacture and selling price, but, in some instances, has been the cause of difficulties in the treatment of patients due to the fact that the sutures or ligatures employed have been below the minimum quality standard allowed for surgical operations, greater chances being taken on the integrity of the base material than is generally allowed.

While the use of fiber material of animals, such for instance as tendons, sinews or ligaments, has been contemplated, the attempt made to produce such product from this large source of supply has not been sufficiently successful to warrant the adoption of this source for the purpose of supply. Furthermore, the methods and operations heretofore contemplated for the purpose of producing sutures and the like, and especially sutures of any considerable length, are such as to render the cost of production expensive.

We have discovered that not only is it possible to utilize this source of supply for this purpose, but, in addition, that the cost of production is so far reduced as to provide a material saving. In addition, we have found that it is possible to produce the suture, ligature or other product of this type in any desired length—for instance, lengths of 1,000 or 2,000 feet—thus enabling the ready production of the cord-like structure by the use of machinery and thereby obtain a more uniform product.

The suture base which we preferably employ in the production of the suture, etc., is a fabricated sheet or web produced from the fiber material, this sheet or web being comparatively thin or film-like and being more or less irregular in width. This sheet or web is produced from animal fiber in the manner more particularly pointed out in our companion application filed July 5, 1917, Ser. No. 178,683—a method which is hereinafter briefly described. The base sheet or web, when used for the present purpose, is cut into a ribbon-like strip or strips of substantially uniform width, and these strips or ribbons are then twisted into cord-like form. If desired, a plurality of these cords may be braided or twisted together to produce a large cord. The strips are substantially uniform in thickness and are of substantially uniform width, so that the cord-like product will be substantially uniform throughout its length.

The present invention is designed more particularly to meet the objections heretofore made to the use of fiber material of this type for this general purpose, and to produce a product which not only is acceptable, but which is capable of manufacture at a decreased cost.

To these and other ends, therefore, the nature of which will be readily understood as the invention is hereinafter disclosed, said invention consists in the improved product and the methods of producing the same, hereinafter more fully described, illustrated in the accompanying drawings, and more particularly pointed out in the appended claims.

In the accompanying drawings, in which similar reference characters indicate similar parts in each of the views.

Figure 1:
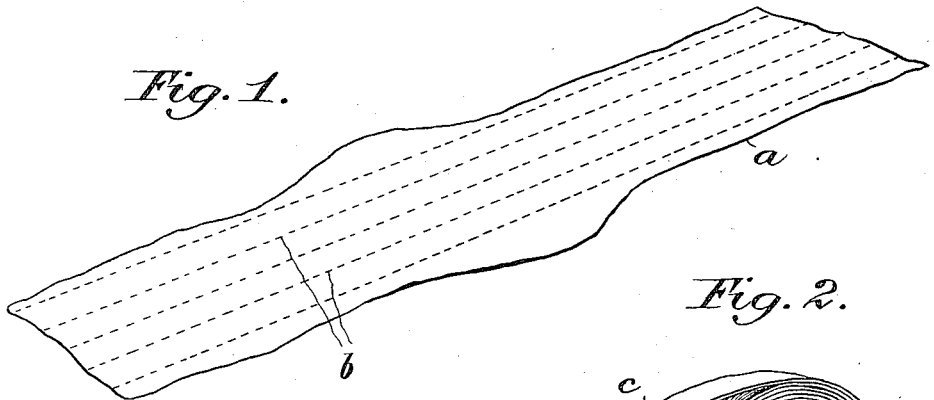
Figure 1 is a perspective view showing, more or less diagrammatically, a portion of a sheet or web from which the strip or strips are taken.

As heretofore indicated, the sheet or web—which forms the base for the suture—and the method of its production, are described and claimed in the companion application above identified.

For explanatory purposes the following brief description of the production of the sheet or web is given.

Practically all of the animal tendons, sinews, or ligaments may be utilized in sheet manufacture, but for the present purpose, it is preferred to employ the longitudinally-extending fibers, these being better adapted for use for the present purpose. For the purpose of explaining the production of the base sheet or web, we assume that it is to be formed from the fibers of the well-known *fascia lata*, a tendon especially adapted for the production of the suture base.

The structure of this material, as supplied to manufacturers, has the longitudinally and transversely extending fibers in bundle form, in addition to adherent flesh, fat, muscle, etc. As the sheet or web is preferably formed from the longitudinally-extending fibers, the material, as supplied, is subjected to a course of treatment which removes or permits removal of the adherent materials, as well as produces a condition of the structure such as will enable the bundles of fibers to be readily segregated. A preferred method of treatment indicated in said application is to soak the material in a weak alkaline solution—caustic soda, for example—containing enzyms, the tendon remaining therein for a considerable period. The soaked tendon is then removed from the solution and subjected to a fiber-loosening action, as by hammering or beating. This successive soaking and fiber-loosening action may be repeated, if found necessary, using a clean solution with each repetition until the undesired parts are removed and the fibers loosened so as to permit of ready separation of the bundles of longitudinally-extending fibers.

The material at this stage is somewhat softened, but a further softening action of the selected fibers is had by subjecting these fibers to a "plumping" treatment produced by placing the material in a stronger alkaline solution from which the enzyms are omitted.

At this stage, the fibers are softened, still maintaining a more or less fibrous formation with each fiber swollen, but the condition is such as will permit of ready separation of the fibers from each other to any extent desired. If the ends of the bundle are found to be insufficiently treated to permit of ready separation, it is preferred to shear off the ends in order that complete fiber separation may be had.

After separation, the "plumped" fiber is subjected to pressure, being placed between opposing faces and subjected to pressure, thus flattening the material of the fiber into sheet form, the width of the sheet depending more or less on the cross-section of the plumped fiber. The opposing surfaces employed are generally formed of suitable fabric which not only provides the flattening action, but in addition, tends to absorb more or less of the moisture which passes out of the fiber during this treatment. This flattening operation apparently changes, to some extent, the texture of the fiber material from its original texture condition, the material itself, however, being sufficiently cohesive to produce a homogeneous texture. The sheet thus fabricated will have a length approximately equal to the length of the fiber from which it is produced. If such length is sufficient for the purpose, the sheet is dried, producing the base for the suture.

If a web formation is desired,—as for instance, a web longer than the normal length of a natural tendon or the fibers employed—sheets may be united longitudinally, a preferred method being to provide an overlapping of sheets, the overlapping length preferably being slightly greater than fifty (50%) per cent. of the length of the sheet, a sheet having one end overlapped by another sheet for a distance extending slightly beyond the medial point in the sheet length, the succeeeding sheet overlapping from the opposite end on the opposite side of the sheet and extending inwardly slightly beyond the center of the sheet. This practically produces a double thickness of sheets at all points excepting at the extreme ends of the overlapping sheets where the additional overlapping length produces a three-layer formation.

Figure 5:
Fig. 5 is a diagrammatic section indicating the manner in which sheets are positioned in order to produce a ribbon or web.

In Fig. 5 we have shown somewhat diagrammatically a preferred way of arranging the overlapping, a sheet 10 being shown as overlapped by sheets 11 and 12 in about the proportions indicated above, indicating the general layer-like arrangement prior to the application of pressure.

This overlapping positioning takes place while the sheet is in its moist condition—it may be in immediate succession to the initial pressing action. The positioned sheets are then placed between layers of canvass or felt and the batch placed in a press and pressure applied, this operation causing the several sheets to be cohesively united into a more or less homogeneous formation.

If desired this overlapping action may be provided before the fibers have been pressed into sheet form, thus combining the positioning and flattening operations with the same result, namely; that the sheet as well as the strips or ribbons cut therefrom will have a length greater than the normal length of a natural tendon or the fibers employed.

The overlapped fibers in either case are apparently more or less broken down under the pressure action and a new arrangement formed while preserving the desired cohesion. We have found that where sheets are positioned in the manner stated, the application of the pressure increases the width of the sheet more or less in accord with the number of overlapping thicknesses.

The sheet or web thus produced forms the base for the suture. In Fig. 1 we have illustrated what may be considered as a fragment of a sheet or web produced in this manner, although it is obvious that the particular characteristics of the sheet or web cannot be indicated in the drawing with any degree of accuracy. In this view the sheet is indicated at $a$ and is represented as being in the end of a thin film. For the purpose of indicating the manner in which the strip or ribbon is formed from the sheet, Fig. 1 is shown as having a plurality of dotted lines $b$ which may indicate the points where ribbons or strips are cut from the sheet or web. The sheet or web, as heretofore pointed out, varies as to width and hence the number of strips or ribbons which may be cut from a sheet or web will depend more or less upon the condition of the intermediate portion of the width of the sheet or web.

Figure 2:
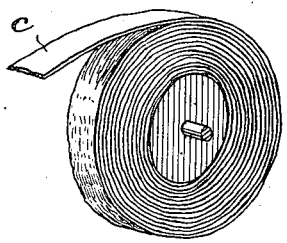
Fig. 2 is a perspective view showing a strip or ribbon in the form of a roll.

The strips or ribbons, which are preferably produced by straight cuts throughout the length of the sheet or web are of suitable width, as for instance ⅛ to ⅜ inches, the thickness of the strip or ribbon being dependent upon the thickness of the sheet or web which is preferably film-like. The cutting of the strip or ribbon from the sheet or web preferably takes place after the sheet or web has been dried so that the strip or ribbon is substantially uniform in width and may be placed in roll form as indicated in Fig. 2, the length of the strip or ribbon, of course, depending upon the length of the sheet or web from which the strip or ribbon is cut. The strip or ribbon is indicated at $c$.

Figure 3:
Fig. 3 is a view showing a strip partially twisted.
Figure 4:
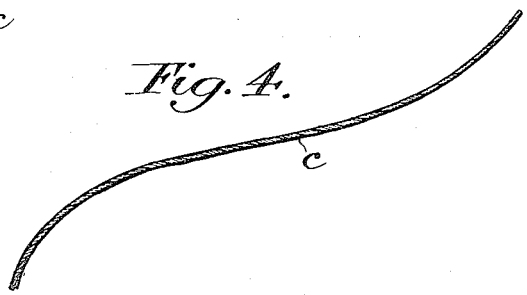
Fig. 4 is a view showing the strip completely twisted into the cord-like product.

The strip or ribbon thus produced is then subjected to a twisting action, Figs. 3 and 4 showing more or less diagrammatically, different stages of the twisting, Fig. 4 indicating somewhat the cord-like product produced by the twisting action. Since the strip or ribbon may be of great length, it will be obvious that the twisting action can be provided by suitable machinery, and as the strip is of substantially uniform width and thickness throughout its length, it will be readily understood that the product provided by the twisting action will be substantially uniform in appearance throughout the length of the cord. Obviously, the cord can be mounted on a spool if desired.

If the suture or string is to be formed from the single cord thus produced, the cord may be readily cut into the desired lengths.

A larger cord may be produced by twisting or braiding a plurality of the cords together, it being readily understood that with the substantially uniform cord provided by the initial twisting, the succeeding twisting or braiding action can be readily provided.

Such twisting or braiding acts to mechanically unite the several strands or cords— each of which is, of course, made up from the fiber. If desired, the strands or cords may be additionally united cohesively or by a more or less coalescing action by the use of a suitable viscous substance capable of coalescing with these fibers, as pointed out in the application of Chas. T. Davis, filed Nov. 9, 1916, Ser. No. 130,365.

Obviously the cord-like product may be employed for various purposes, and while particularly adaptable for use as a suture or ligature, it is obvious that it may be employed in other relations, as for instance the stringing of musical instruments, of tennis rackets, etc.—uses for which "catgut" has heretofore been employed. It is to be understood that the invention is not limited in this respect.

While we have shown and described various products and ways in which these products may be provided, it will be understood that changes or variations therein may be found essential or desirable to meet the various exigencies of use, and we desire to be understood as reserving the right to make any and all such changes or modifications, either in the product or in the method of production or both, in so far as the same is permitted by the spirit and scope of the invention as expressed in the accompanying claims when broadly construed.

The invention also contemplates the use of the tendons of fish—whales, for instance—and the tendons and intestines of fowls as the source of supply, and it is to be understood that such sources are considered as substitutes and substantial equivalents for the "animal" fiber material herein referred to, and therefore fall within the spirit and scope of the invention as claimed.

Having thus described our invention, what we claim as new is:

1. A suture or other cord formed from a fabricated strip or ribbon composed of plumped animal fiber.

2. A suture or other cord consisting of a fabricated film-like strip or ribbon formed from animal fiber, said strip or ribbon being twisted into a cord-like configuration.

3. A suture or other cord consisting of a fabricated strip or ribbon of plumped and flattened animal fiber twisted to form.

4. A suture or other cord consisting of a fabricated strip or ribbon of animal tendon fibers twisted to form, said strip or ribbon being of greater length than the normal length of a natural tendon.

5. A suture or the like comprising a strip twisted into a cord-like configuration, said strip being formed from a sheet-like base composed of flattened animal fiber material.

6. A suture or the like comprising a thin strip of animal fiber material flattened into sheet-like form, said strip being twisted into a cord-like configuration.

7. The method of producing a suture or other cord, which consists in fabricating softened animal tendon fiber material to form a sheet of substantially uniform thickness and of a length greater than that of a natural tendon fiber, obtaining a ribbon of substantially uniform width from said sheet, and twisting the ribbon into a cord-like configuration.

8. The method of producing a suture or the like which consists in fabricating a film-like sheet from animal fiber material, obtaining a strip or ribbon of substantially uniform width from the said sheet, and twisting the strip or ribbon into a cord-like configuration.

9. The method of producing a suture or the like which consists in fabricating a film-like ribbon of substantially uniform width from softened animal fiber material, and twisting the ribbon into a cord-like configuration.

10. The method of producing a suture or the like which consists in treating animal fiber material to separate the fibers, flattening the fiber into thin sheet-like base material, and twisting a strip of said base material into a cord-like configuration.

In testimony whereof we have hereunto set our hands in presence of two subscribing witnesses.

PAUL T. WISE.
JAMES F. MALCOLM.
CHARLES T. DAVIS.